UNITED STATES PATENT OFFICE.

JACOB W. DECASTRO, OF MAHWAH, NEW JERSEY.

PROCESS OF CONVERTING STARCH INTO GLUCOSE.

SPECIFICATION forming part of Letters Patent No. 279,354, dated June 12, 1883.

Application filed October 31, 1881. (No specimens.)

*To all whom it may concern:*

Be it known that I, JACOB W. DECASTRO, a citizen of the United States, residing at Mahwah, in the county of Bergen and State of New Jersey, have invented a new and Improved Process of Converting Starch into Glucose; and I hereby declare the following to be a full, clear, and exact description of the same.

My invention consists, broadly, in the application of carbonic-acid gas, either alone or in conjunction with other acids, for the purpose of converting starch into glucose.

It consists, also, in the particular manner in which I apply the carbonic acid—namely, in conjunction with steam; and it consists, further, in the method which I adopt for accelerating the action of the acid upon the starch, such method consisting in forcing an extra quantity of carbonic-acid gas into the converter or forcing air into the same.

To carry my invention into effect I proceed in the following manner: I mix the starch with water in such quantity as to yield a moderately thick consistency, though I do not recommend a lower proportion than three parts of water to two parts of starch. If this mixture should have an alkaline reaction, I neutralize it, or render it slightly acid, by the addition of a suitable acid. I then run the mixture into a close vessel, which may or may not be provided with a stirrer, and of strong construction to render it capable of resisting a high pressure. I then admit into the vessel steam at a high pressure and a jet of carbonic-acid gas, and at the same time set the stirrer, if employed, in motion, the object of employing the stirrer being to facilitate the absorption by the mixture of the steam and carbonic-acid gas, and also to obviate, as far as possible, the formation of paste. After keeping the mass under a steam-pressure of about from forty to eighty pounds for a sufficient time to start the conversion, I admit carbonic-acid gas into the vessel under such pressure as to increase the pressure within the vessel to a high degree—viz., anywhere from eighty to three hundred pounds. In this way I am enabled to supply the starch with a large quantity of the converting agent. Carbonic acid at a low pressure is a weak acid, but under a high pressure it becomes a strong acid, and acquires the power of converting starch into glucose. The requisite pressure may also be obtained by the subsequent injection of air instead of carbonic-acid gas, or by a mixture of the two; but I find the results to be more satisfactory when carbonic-acid gas alone is employed as above described. However, as one of the chief objects sought is to obtain the additional pressure, anything which will accomplish this is to be regarded as a mere substitute for the carbonic-acid gas, and hence as an equivalent.

No claim is made to the general mode of procedure above described, except where carbonic-acid gas is the converting principle employed.

What I claim as new, and desire to secure by Letters Patent, is—

1. Carbonic-acid gas under pressure as the active principle in converting starch into glucose.

2. The process of converting starch into glucose which consists in diluting it with water and subjecting the mixture in a close vessel to the combined action of steam and carbonic-acid gas under pressure, substantially as described.

3. The process of converting starch into glucose which consists in diluting it with water subjecting the mixture in a close vessel to the combined action of steam and carbonic-acid gas, and then increasing the pressure to a still higher point by the injection of carbonic-acid gas alone, or its equivalent, substantially as described.

JACOB W. DECASTRO.

In presence of—
ADOLPHUS M. MAAS,
MARTIN E. WALDSTEIN.